United States Patent
McGrath et al.

(10) Patent No.: US 6,651,438 B2
(45) Date of Patent: Nov. 25, 2003

(54) ROCKET NOZZLE ASSEMBLY HAVING ROTATABLE VARIABLE THRUST CONTROL CYLINDERS, AND ROCKET ASSEMBLY COMPRISING THE SAME

(75) Inventors: David K. McGrath, Elkton, MD (US); Thomas J. Kirschner, Jr., North East, MD (US); Daniel C. Dombrowski, Elkton, MD (US)

(73) Assignee: Alliant Techsystems Inc., Edina, MN (US)

( * ) Notice: Subject to any disclaimer, the term of this patent is extended or adjusted under 35 U.S.C. 154(b) by 36 days.

(21) Appl. No.: 09/941,397

(22) Filed: Aug. 29, 2001

(65) Prior Publication Data

US 2003/0046922 A1 Mar. 13, 2003

Related U.S. Application Data

(60) Provisional application No. 60/228,765, filed on Aug. 30, 2000.

(51) Int. Cl.[7] .................................................. F02K 9/80
(52) U.S. Cl. ..................... 60/771; 239/265.19
(58) Field of Search ................ 60/771; 239/265.19, 239/265.33

(56) References Cited

U.S. PATENT DOCUMENTS

| | | | |
|---|---|---|---|
| 3,130,544 A | * | 4/1964 | Penza .................. 239/265.19 |
| 3,192,709 A | * | 7/1965 | Hardy .................. 239/265.19 |
| 3,691,770 A | | 9/1972 | Nunn |
| 3,692,258 A | | 9/1972 | Parilla |
| 3,806,064 A | | 4/1974 | Parilla |
| 3,907,222 A | | 9/1975 | McComas |
| 3,948,042 A | | 4/1976 | Beardsley et al. |
| 3,989,191 A | | 11/1976 | McCullough |
| 4,442,669 A | | 4/1984 | Burkes, Jr. et al. |
| 4,444,006 A | | 4/1984 | Burkes, Jr. et al. |
| 4,579,299 A | | 4/1986 | Lavery et al. |
| 5,092,524 A | | 3/1992 | Garrett et al. |
| 5,294,055 A | | 3/1994 | Garrett et al. |
| 5,491,973 A | | 2/1996 | Knapp et al. |

* cited by examiner

*Primary Examiner*—Ehud Gartenberg
(74) *Attorney, Agent, or Firm*—TraskBritt

(57) ABSTRACT

A rocket nozzle assembly is provided for operatively coupling to a rocket motor. The assembly includes a nozzle insert structure having a converging-diverging passageway with a throat region. First and second thrust control cylinders are parallel to each other and rotatable about respective axes transverse to the passageway central axis. The first and second thrust control cylinders intersect the throat region and include respective grooves. A thrust control cylinder-rotating subassembly is operatively associated with the first and second thrust control cylinders to rotate the cylinders about their respective axes and move the grooves relative to the throat region. Movement of the grooves changes the effective cross-sectional throat area of the converging/diverging passageway at the throat region for controlling the thrust when the rocket nozzle assembly is operatively engaged with an operating rocket motor.

18 Claims, 10 Drawing Sheets

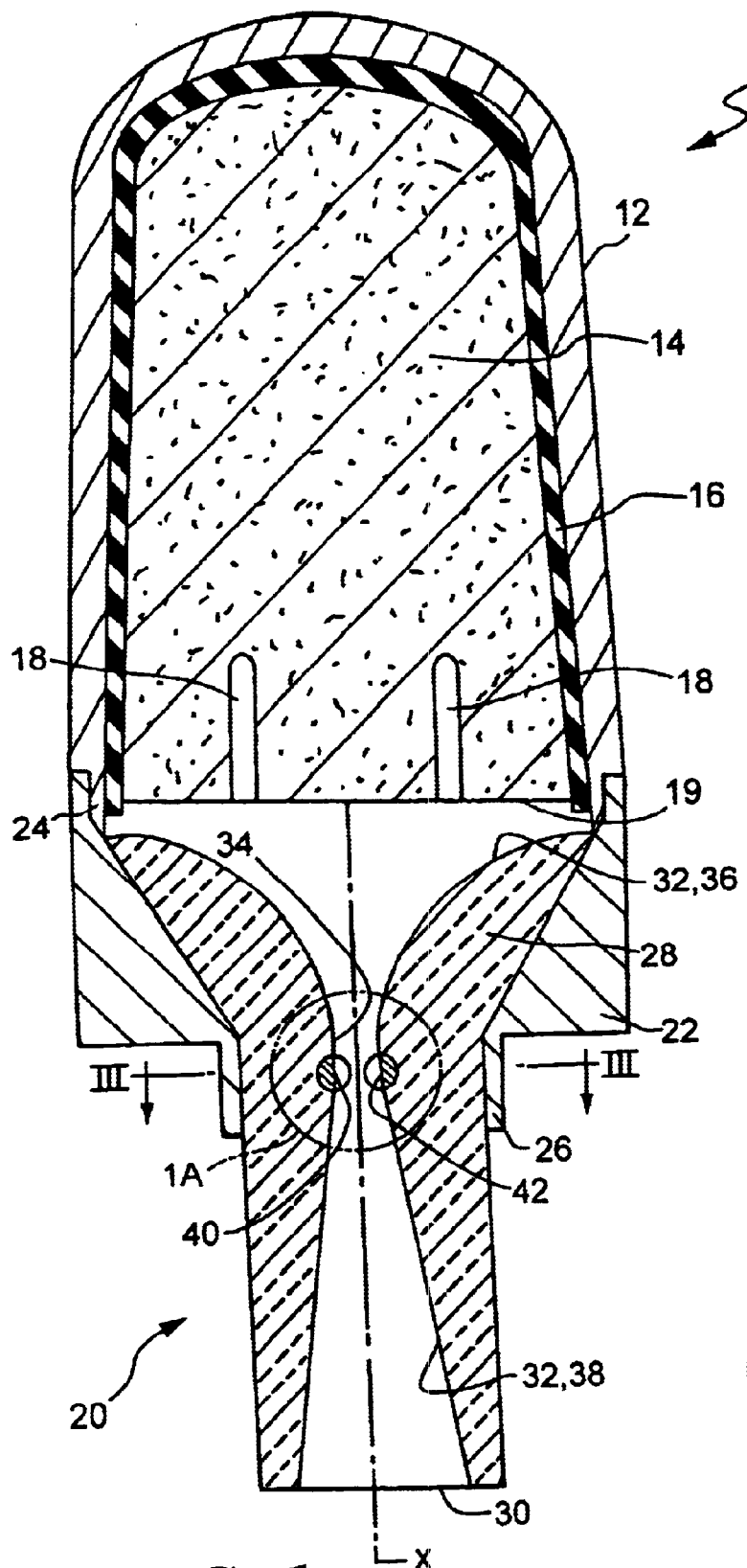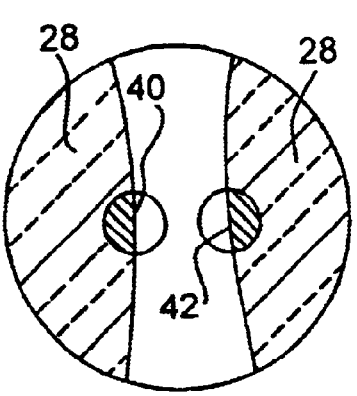
*FIG 1*
*FIG 1A*

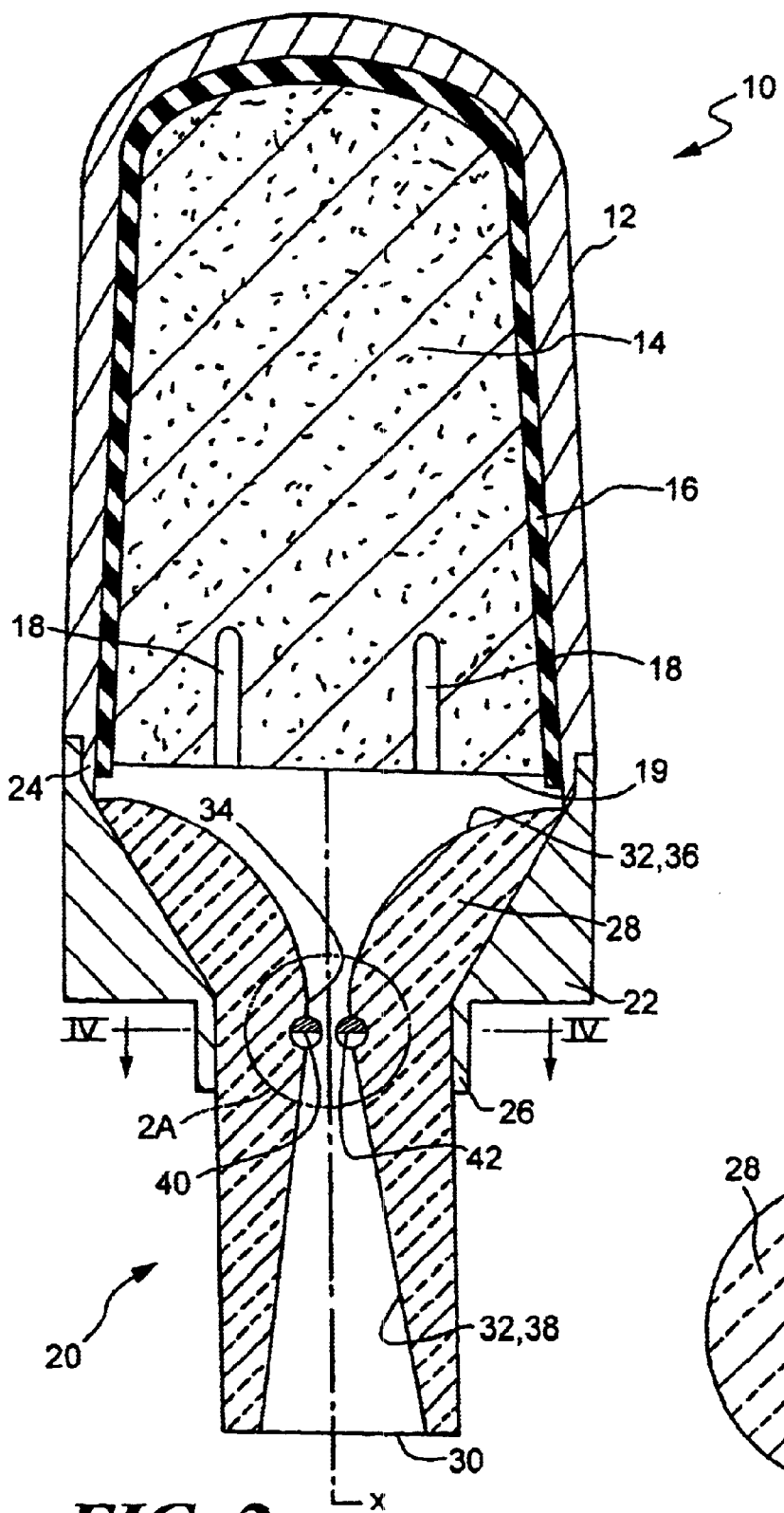
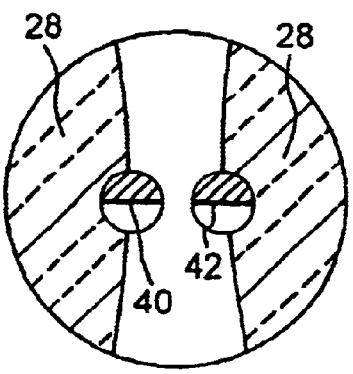
FIG 2
FIG 2A

ROCKET NOZZLE ASSEMBLY HAVING ROTATABLE VARIABLE THRUST CONTROL CYLINDERS, AND ROCKET ASSEMBLY COMPRISING THE SAME

RELATED APPLICATION

This application claims the benefit of priority of U.S. Provisional Application 60/228,765, filed in the U.S. Patent & Trademark Office on Aug. 30, 2000, the complete disclosure of which is incorporated herein by this reference.

BACKGROUND OF THE INVENTION

1. Field of the Invention

This invention relates to a rocket nozzle assembly capable of implementing in-flight thrust variation in a controlled manner by actuation of thrust control cylinders. This invention is also related to a rocket assembly comprising a rocket nozzle assembly with thrust control cylinders.

2. Description of Related Art

Rocket motors produce thrust by expelling high pressure combustion chamber gas through a nozzle throat and expanding the expelled gas against the nozzle walls.

Rocket motors, especially tactical solid rocket motors, frequently need some form of in-flight thrust management. Generally, thrust is controlled in flight by the use of predesigned boost-sustain thrust solid rocket fuel grains. For example, the propellant grain is often designed to have a high burning surface area during an initial boost phase of the burn and then transition to a lower burning surface area for the subsequent sustain phase (or remainder) of the burn. The propellant burning response for the sustain phase results in decreased motor pressure and, consequently, decreased thrust.

One of the drawbacks of a two-phase (or multi-phase) propellant grain is that the nozzle throat area is usually optimized for performance of only one of the phases, typically the boost phase. This drawback is especially problematic where it is desired to control the amount of thrust produced during the sustain flight phase of a rocket motor. One manner of varying thrust during the sustain phase is to control the effective throat area. Specifically, if the effective throat area of the nozzle is increased, the combustion chamber pressure will decrease, resulting in an attendant drop in the thrust level. On the other hand, if the effective cross-sectional area of the throat is decreased, the pressure in the combustion chamber will increase, resulting in an attendant increase in thrust level. By controlling the motor pressure through active throat area control, the engine can be operated over a larger altitude range in the atmosphere and the thrust can be modulated for optimal performance. Improved performance may result in improved ranges for tactical missiles.

Several approaches for changing the throat area of a rocket nozzle have been proposed and practiced. One of the most common approaches involves the use of a pintle movable along a nozzle axis relative to the nozzle throat, as described in, for example, U.S. Pat. No. 3,948,042 to Beardsley et al. Generally, a pintle is hydraulically moved axially in one direction along the nozzle axis towards the throat region to decrease the size of the throat, and in an opposite axial direction away from the throat region to increase the size of the throat. As the throat size decreases, the internal pressure increases. On the other hand, as the throat size increases, the internal pressure decreases. In this manner, thrust levels may be varied and controlled by axial movement of the pintle. The pintle design provides flexibility by allowing the nozzle area to be varied in flight in accordance with a particular operation profile and, with some designs, allows for the possibility of multiple different throat sizes. However, the conventional pintle design has drawbacks. For example, actuation mechanisms for the pintle are commonly carried inside of the motor case. As a result, the actuation mechanisms decrease the available case volume into which propellant may be located and raise design concerns over thermal protection and integration of the pintle actuation system. Also, a pintle is subjected head-on to the full force of combustion products passing through the nozzle.

A modification to the conventional pintle is described in U.S. Pat. No. 3,907,222, in which a fustro-conical pintle is mounted on a shaft rotatable on an axis which is transverse to the nozzle axis and upstream from the throat section. Rotation of the shaft 180 degrees about its axis moves the frustro-conical pintle into and out of an annulus-forming position. When the pintle is out of the annulus-forming position, the throat section is operable at a normal (large) throat dimension, substantially unaffected by the pintle. On the other hand, in the annulus-forming position, the pintle is rotated closer to the throat, thereby forming an annulus between the pintle and the inner wall of the convergent section. The annulus is smaller in cross-sectional area than the open throat and, as a consequence, internal pressures of the rocket motor are increased when the pintle is in the annulus-forming position. Thus, movement of the pintle into and out of the annulus-forming position allows for dual-mode control over thrust by control of the throat area.

However, the modified pintle design of U.S. Pat. No. 3,908,222 is not without its own drawbacks. Because the pintle is located along the nozzle axis, the pintle carries the full blowout load of the operating pressure and, therefore, must generate high actuation torques. Also, the pintle of this modified design rotates into either a fully open or closed position and is not movable into intermediate positions to permit continuous variable control over the throat area.

BRIEF SUMMARY OF THE INVENTION

In accordance with the principles of this invention, the above-discussed problems of the related art are overcome by the provision of a rocket nozzle assembly comprising a nozzle insert, first and second thrust control cylinders, and at least one thrust control cylinder-rotating subassembly. The nozzle insert structure provides a converging region that converges in cross-section to meet a throat region located aft of the converging region and a diverging region located aft of the throat region and extending radially outward. The converging and diverging regions and throat region are coaxially aligned with each other along a passageway central axis and collectively define a converging/diverging passageway. The first and second thrust control cylinders are rotatable about respective first and second axes, which are arranged transverse to the passageway central axis. The first thrust control cylinder has a first outer surface with at least one first groove extending transverse to the first axis, and the second thrust control cylinder has a second outer surface with at least one second groove extending transverse to the second axis. The first and second axes both lie in a plane that is normal to the passageway central axis and are parallel to and spaced apart from one another.

The thrust control cylinder-rotating subassembly is operatively associated with the first and second thrust control cylinders to rotate the first and second thrust control cylinders about the first and second axes, respectively, relative to the throat region between an open position and at least one throat-reduction position. In the open position, the first and second grooves face each other from diametrically opposite sides of the throat region to maximize the effective cross-sectional throat area at the throat region. In the throat-reduction position, outer surface portions of the first and second thrust control cylinders intersect and partially obstruct the passageway at the throat region to reduce the effective cross-sectional throat area relative to the effective cross-sectional throat area in the open position. By controlling the effective cross-sectional throat area through which combustion products may pass, it is possible to control the amount of thrust generated when the rocket nozzle assembly is operatively engaged with an operating rocket motor.

The thrust control cylinder-rotating subassembly is preferably capable of moving the first and second thrust control cylinders in a controlled manner to any position between the open position and the fully closed position. In this manner, the effective cross-sectional throat area can be proportionally controlled by moving and holding the variable thrust control cylinders at any rotational position between the open and fully closed position. It is possible, however, to design the thrust control cylinder-rotating subassembly to limit rotational movement to two or more discrete positions, e.g., the open position, the throat-reduction position, and optionally one or more partially closed positions therebetween.

This invention is also directed to a rocket assembly comprising a case, at least one propellant, and at least one nozzle assembly.

These and other objects, features, and advantages of the present invention will become apparent from the following detailed description of the invention when taken in conjunction with the accompanying drawings which illustrate, by way of example, the principles of this invention.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention. In such drawings:

FIG. 1 is a sectional side view of a rocket assembly including rotatable variable thrust control cylinders according to the invention, with the variable thrust control cylinders shown in a fully open position;

FIG. 2 is a sectional side view of the rocket assembly of FIG. 1, but depicting the rotatable variable thrust control cylinders in a fully closed position;

DETAILED DESCRIPTION OF THE INVENTION

Figure 3:
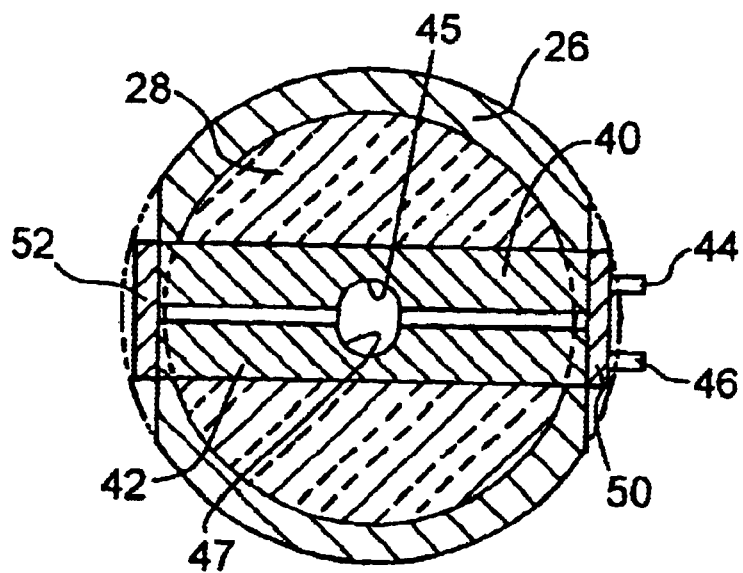
FIG. 3 is a sectional view taken along sectional line III—III of FIG. 1.

Referring now to FIGS. 1 and 2, an example of a rocket assembly incorporating the rotatable variable thrust cylinders of this invention is generally designated by reference numeral 10. The rocket assembly includes an outer main case 12 housing a solid propellant 14. The outer main case 12 can be made, for example, of metal or metal alloys, such as steel, aluminum, or titanium, or from composite-wound pre-preg. The illustrated solid propellant 14 includes eccentric perforations 18 extending longitudinally and terminating at an aft face 19 of the solid propellant 14. A layer of insulation 16 and optionally a liner (not shown) are interposed between the outer main case 12 and the solid propellant 14. The insulation 16 and the liner serve to protect the outer main case 12 from the extreme conditions produced as the propellant burns. Suitable insulation 16 materials are known in the art and may include, by way of example, EPDM rubber. The liner serves the additional functions of bonding the propellant 14 either to the insulation 16 or directly to the outer main case 12 and creating a seal to prevent hot combustion gases and particles from penetrating into the outer main case 12. Methods for making and loading the propellant 14, insulation 16, and liner in the outer main case 12, such as by conventional casting and curing techniques, are well known to those skilled in the art, such that the skilled artisan can readily practice such techniques with this invention without undue experimentation. Also well known is the use of igniters (not shown) for initiating propellant burn. Placement and selection of a suitable igniter depends upon grain configuration and composition and is also within the routine skill of the skilled artisan.

Although the illustrated embodiment is of a solid rocket motor, it is to be understood that the nozzle assembly of this invention can be applied to various other types of rocket motors, including end-burn solid propellants, or solid propellants having a central perforation or other arrangements and shapes of perforations. The thrust control principles of this invention can also be applied to hybrid systems and liquid oxidizer/liquid fuel systems (engines).

Operatively engaged with the outer main case 12 is a nozzle assembly, which is generally designated by reference numeral 20. The forward portion of the nozzle assembly 20 includes a main nozzle body 22 coupled via an end closure to the outer main case 12. Although not shown, it is common to place an O-ring at the end closure to seal the coupling interface, such as at position 24. A flanged nozzle portion 26 extends aftwardly in a tube-like shape from the main nozzle body 22. Examples of materials from which the main nozzle body 22 and flanged nozzle portion 26 may be made include steel, other metals, and/or pre-preg wound composite.

An annular nozzle insert structure 28 is seated inside of the main nozzle body 22 and extends through and aftward of the flanged nozzle portion 26, terminating at a nozzle outlet 30. The nozzle insert structure 28 has an inner surface 32 that defines a converging/diverging passageway (unnumbered) with a throat region 34 of restricted cross-sectional area. During operation of the rocket assembly 10, combustion products, including hot exhaust gases, are generated by the rocket assembly 10 and passed through the throat region 34.

The inner surface 32 of the nozzle insert structure 28 also provides a forward converging region 36 extending from a forward portion of the nozzle assembly 10 to a forward edge of the throat region 34. Aft of the throat region 34, the inner surface 32 of the nozzle insert structure 28 expands to provide a diverging region 38 or skirt until terminating at the nozzle outlet 30. The throat region 34, converging region 36, and diverging region 38 are disposed coaxially along nozzle longitudinal axis $L_x$.

The nozzle insert structure 28 is designed to withstand the elevated temperatures and pressures generated by propellant combustion and the erosive effects caused by the high velocities at which the combustion products pass over the inner surface 32 of the nozzle insert structure 28. Generally, the choice of the nozzle insert structure 28 material is dependent on mission parameters of the rocket assembly 10 (e.g., time and pressure) and the propellant 14 selection. Carbon-based and silica-based materials are highly advantageous for use as the nozzle insert structure 28 due to the excellent ablative properties, inexpensive cost, and relatively low weight of these materials. Carbon-based and silica-based materials include, but are not limited to, carbon, silica, or graphite bulk and composite materials subject to carbonization or graphitization (known as carbon/carbon or graphite/carbon cloth), fiber-filled or powder-filled phenolic composites, and also a large array of metal or silicon carbides. Refractory metals and metal alloys are also occasionally used in rocket motors as the nozzle insert structures 28 due to their high erosion resistance. Examples of such refractory materials are tungsten, rhenium, tantalum, and alloys containing one or more of these refractory metals. The nozzle insert structure 28 can also be made of layers of different materials. For example, a carbon or silica-based material can form an annular substrate, with one or more refractory metals or alloys applied (e.g., by a vacuum plasma spraying technique) as a radially inner shell on the substrate radially inner surface. The nozzle insert structure 28 can also be made of assemblies of different above-described materials in each of the converging, throat, and/or diverging regions.

Figure 4:
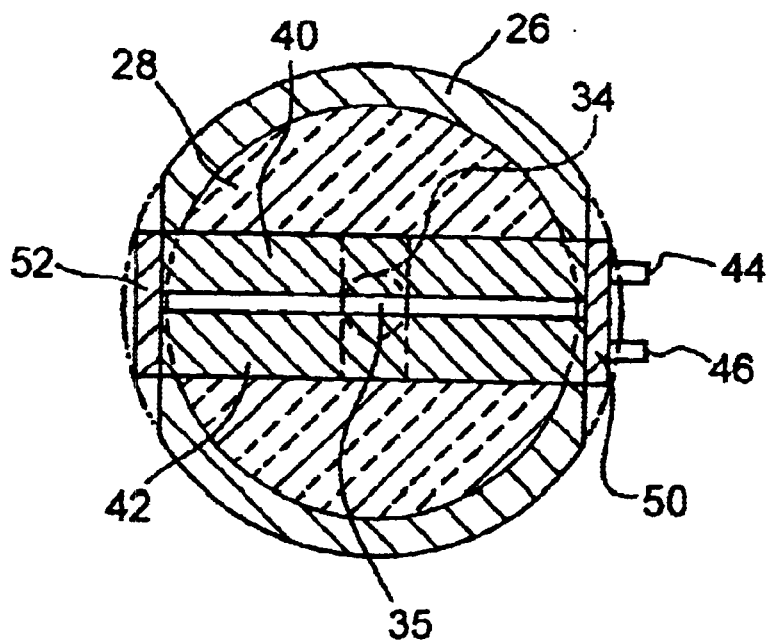
FIG. 4 is a sectional view taken along sectional line IV—IV of FIG. 2.
Figure 5:
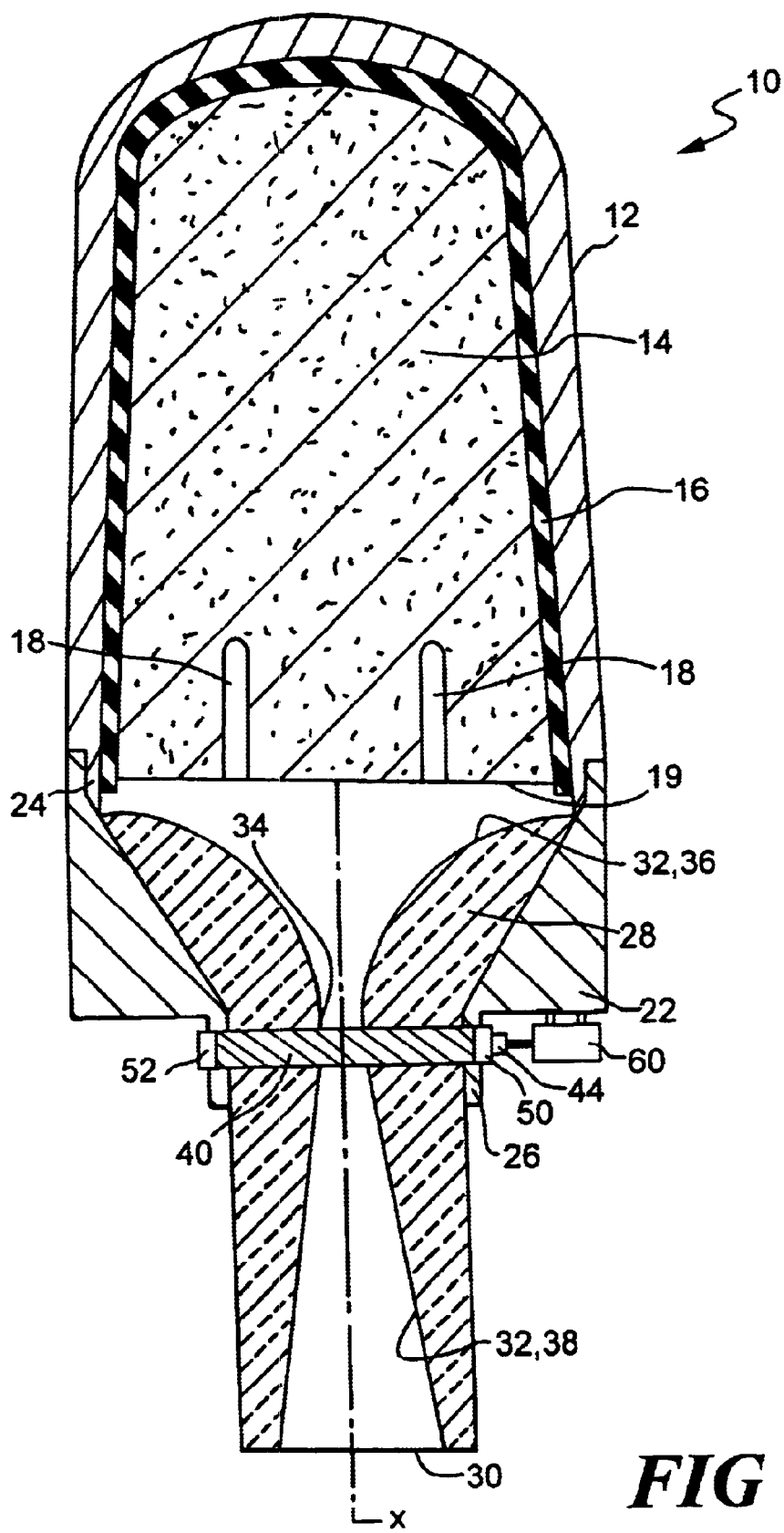
FIG. 5 is a sectional side view of the rocket assembly of FIG. 1, taken at an angle displaced 90° from that of FIG. 1.

As shown in FIGS. 3–5, the nozzle insert structure 28 has bores (unnumbered) extending therethrough for housing a first variable thrust control cylinder 40 and a second variable thrust control cylinder 42. The first and second variable thrust control cylinders 40 and 42 have respective first and second axes that are parallel to each other, yet arranged in a common plane that is transverse to the nozzle longitudinal axis $L_x$. The first and second thrust control cylinders 40 and 42 are arranged to intersect and pass through the throat region 34. The variable thrust control cylinders 40 and 42 are spaced equidistant from (and on opposite sides of) a common, parallel diameter of the throat region 34. The spacing and diameter of the variable thrust control cylinders 40 and 42 determine the total potential change in area of the passageway at the throat region 34, and when combined with the propellant burning rate characteristics, these features jointly determine the total thrust variability potential. Specific mission needs will determine the design combination required for the cylinders and propellant.

The bores in which the first and second variable thrust control cylinders 40 and 42 are housed may be formed, for example, by conventional machining techniques. The diameters of the bore peripheries are set to be slightly greater than the outer diameters of the first and second variable thrust control cylinders 40 and 42, so that relatively small gaps remain between the bores and the outer surfaces of the variable thrust control cylinders 40 and 42. The gaps should be sufficient in dimension to permit the variable thrust control cylinders 40 and 42 to be rotated about their respective axes, while allowing for normal expansion and contraction that the variable thrust control cylinders 40 and 42 and the nozzle insert structure 28 may undergo when subjected to extreme operating temperatures. The gaps should not be made so large as to permit significant amounts of combustion gases to pass therethrough.

The bores of the nozzle insert structure 28 are aligned at their opposite ends with apertures in the flanged nozzle portion 26. The outer surface of the flanged nozzle portion 26 includes diametrically opposite chamfered portions (shown in FIGS. 3 and 4, but unnumbered) for fitting and securing retainer plates 50 and 52, respectively. Although not shown, at the interior surface of each of the retainer plates 50 and 52, an O-ring or multiple O-rings, or other seal materials, such as C-rings, K-rings, or graphoil, may be placed for sealing and preventing the escape of combustion gas through the gaps. Although FIGS. 3–5 illustrate retainer plates 30, 52 positioned at diametrically opposed positions on the nozzle insert structure 28, it is to be understood that the nozzle insert structure 28 can be milled so that one of the ends of each of the bores does not reach the outer surface of the nozzle insert structure 28. Also not shown, cooling systems for cooling the O-ring seals may optionally be provided.

Figure 6:
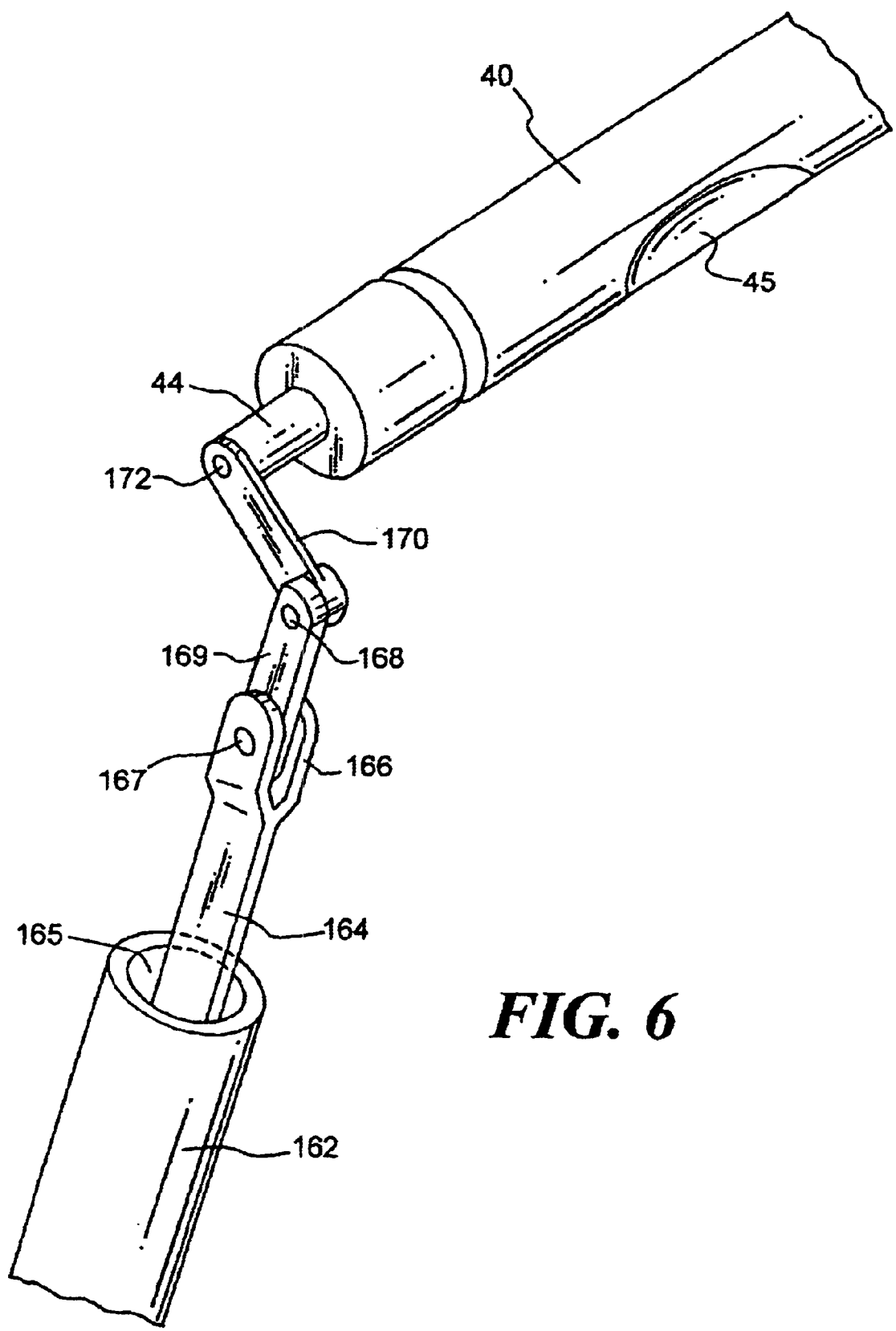
FIG. 6 is an isolated perspective view of a thrust control cylinder-rotating subassembly according to a first embodiment of the invention, depicting the thrust control cylinder-rotating subassembly operatively associated with one of the variable thrust control cylinders.

An enlarged view of the first variable thrust control cylinder 40 is shown in FIG. 6, in which the first variable thrust control cylinder 40 is depicted having a first shaft 44 and a first concave groove 45. The first groove 45 has an axis substantially transverse to the axis of the first shaft 44. The second variable thrust control cylinder 42 similarly contains a second shaft 46 and a second concave groove 47. (See FIG. 3.) The first groove 45 and the second groove 47 are arranged along the lengths of the first and second variable thrust control cylinders 40 and 42 to permit axi-symmetric alignment with the throat region 34. In a preferred embodiment, each of the grooves 45 and 47 has curvilinear cross-sections that are dimensioned and shaped substantially identically to an inner periphery of the nozzle throat structure 28 at the throat region 34. It is also preferred that the first groove 45 and the second groove 47 extend radially inward to the central axis of the first and second variable thrust control cylinders 40 and 42, as shown in FIG. 3. It is to be understood, however, that the grooves 45 and 47 can undertake shapes and dimensions different from the inner periphery of the nozzle throat region 34, and that the grooves 45 and 47 may extend radially inward by a distance less than or more than the radial dimensions of the variable thrust control cylinders 40 and 42.

As shown in FIG. 5, a thrust control cylinder-rotating subassembly 60 is shown mounted on the aft face of the main nozzle body 22, although it should be understood that the subassembly 60 may be mounted elsewhere, such as on the flanged nozzle portion 26. The thrust control cylinder-rotating subassembly 60 is operatively associated with the first and second variable thrust control cylinders 40 and 42 to permit rotation of the first and second variable thrust control cylinders 40 and 42 about their respective first and second axes from an open position to at least one throat-reduction position and preferably a plurality of different throat-reduction positions. Irrespective of which of these mounting positions is selected for the thrust control cylinder-rotating subassembly 60, the mounting of the subassembly 60 outside of the outer main case 12 simplifies integration of the variable thrust assembly onto the rocket assembly 10 and increases available motor case volume for maximizing propellant 14 loading.

The open position is depicted in FIGS. 1 and 3, in which the passageway (viewed from above) at the throat region 34 has an effective circular cross-section. The first groove 45 of the first variable thrust control cylinder 40 faces the second groove 47 of the second variable thrust control cylinder 42, so that the grooves 45 and 47 are in axi-symmetric alignment with the throat region 34. In this open position, the effective cross-sectional area of the nozzle throat region 34 is maximized, since the grooves 45 and 47 of the first and second variable thrust control cylinders 40 and 42 face the throat region 34 without blocking the passageway. Thus, combustion products are able to flow through the throat region 34 of the throat insert structure 28 substantially unaffected by the variable thrust control cylinders 40 and 42. The open position is typically used during the initial boost and any sustain portions of flight.

The throat-reduction position shown in FIGS. 2 and 4 represents a fully closed state, in which each of the first and second variable thrust control cylinders 40 and 42 has been rotated (in opposite directions relative to each other) about its respective axis 90 degrees relative to the open position. In the fully closed state depicted in FIG. 4, the first and second grooves 45 and 47 of the first and second variable thrust control cylinders 40 and 42 face aftward towards the nozzle outlet 30, so as not to affect the area of the throat region 34. Instead, outer surface portions of the first and second variable thrust control cylinders 40 and 42 intersect the throat region 34 to provide the passageway at the throat region 34 with an effective rectangular cross-section 35 (viewed from above). The effective cross-sectional area of the passageway at the throat region 34 in the fully closed state is reduced (compared to the maximum effective cross-sectional area established in the open position) to approximately equal to the diameter of the throat region 34 multiplied by the spacing between facing outer surface regions of the variable thrust control cylinders 40 and 42. The smaller effective cross-sectional area of the throat region in the closed position allows for buildup of internal pressures, thus making the closed position suitable, for example, to attain in-flight re-boost activity.

In the illustrated embodiment, rotation of the variable thrust control cylinders 40 and 42 ninety degrees each in opposite directions converts the passageway cross-section at the throat region 34 from a circular cross-section shown in FIG. 3 to the substantially rectangular cross-section 35 shown in FIG. 4. It is also to be understood that a wide range of thrust control can be achieved by rotating the variable thrust control cylinders 40 and 42 to any position between the 0 degree and 90 degree positions to proportionally transform the effective cross-sectional area of the passageway at the throat region 34. In this manner, continuous variable thrust control is attained.

Erosion may be deterred, especially at the grooves 45 and 47, by rotating the variable thrust control cylinders 40 and 42 beyond 90 degrees, for example, to as much as approximately 180 degrees relative to their fully open positions.

The size of the variable thrust control cylinders 40 and 42 is determined by the propellant 14 ballistics and the degree of throat area change needed to achieve the desired thrust profile. Material selection for the variable thrust control cylinders 40 and 42 is dependent upon the propellant 14 used, the operating pressure, and the intended burn time. Simple, low-cost, graphite rods can be used in some instances. Other higher strength carbon materials and refractory metals can also be used to minimize or substantially eliminate erosion. Selection of suitable materials for making the variable thrust control cylinders 40 and 42 is within the purview of the skilled artisan and can be performed without undue experimentation.

In one mode of operation contemplated by the invention, known launch dynamics, such as common boost-sustain grains, can be designed to handle the initial boost stage at launch, with the variable thrust control cylinders 40 and 42 retained in their fully open position. After the initial boost, the variable thrust control cylinders 40 and 42 can be actuated to achieve any thrust profile. Depending upon the size and spacing between the variable thrust control cylinders 40 and 42, the fully closed position may drive the motor maximum expected operating pressure (MEOP) so that the rocket assembly 10 reaches thrust levels approaching or possibly even matching the full-boost thrust condition at the initial boost stage.

If desired, the variable thrust control concept of this invention can also be used to compensate for temperature variations. Under cold conditions, the throat region 34 may be partially closed by the variable thrust control cylinders 40 and 42 during the boost phase. During a re-boost phase, the throat region 34 can be opened to reduce or maintain the MEOP for hotter conditions.

Embodiments of the thrust control cylinder-rotating subassembly 60 will now be explained with reference to FIGS. 6–11. Identical parts of the variable thrust control cylinders, shafts, and grooves are labeled with the same reference numerals in these figures for each of the embodiments. The illustrated embodiments are representative, not exhaustive, of the possible designs for the thrust control cylinder-rotating subassembly 60. Modifications and equivalents of the illustrated designs, as well as alternative designs capable of rotating the variable thrust control cylinders 40 and 42 to achieve variable and continuously variable thrust control, are covered by this invention.

The thrust control cylinder-rotating subassembly 60 may comprise two separate actuators individually operatively connected to respective ones of the variable thrust control cylinders 40 and 42. The two separate actuators may be operated simultaneously to rotate their respective variable thrust control cylinders 40 and 42 at equal degrees to open, close, or partially close the throat region 34. Additionally, thrust vector forces can be attained by actuating the two separate actuators at different times or by different amounts, so that the rotational position of the first variable thrust control cylinder 40 differs from the rotational position of the second variable thrust control cylinder 42.

In accordance with a first embodiment of this invention, a suitable thrust control cylinder-rotating subassembly for separately and independently rotating variable thrust control cylinders 40 and 42 is shown, in part, in FIG. 6. Actuator 162 shown in FIG. 6 is a push-pull actuator having push-pull rod 164 protruding from the mouth 165 of the actuator 162. The push-pull rod 164 has a distal end terminating at a clevis 166. The clevis 166 is pivotally connected via pivot pin 167 to connection link 169. The opposite end of the connection link 169 is coupled to arm 170 at pivot joint 168. The arm 170 is coupled to first shaft 44 of the first variable thrust control cylinder 40 at joint 172. In operation, the actuator 162 can be operated to move the clevis 166 of the push-pull rod 164 away from the mouth 165, to thereby push the connection link 169. As the connection link 169 is pushed, the end of the arm 170 joined at pivot joint 168 is pushed in an upward direction, causing the arm 170 to rotate the first variable thrust control cylinder 40 fixed thereto counter-clockwise about the axis of the first shaft 44. Movement of the push-pull rod 164 in the opposite direction moves the clevis 166 towards the mouth 165, thereby pulling the connection link 169. As the connection link 169 is pulled towards the mouth 165, the end of the arm 170 joined at pivot joint 168 is pulled downward, causing the arm 170 to rotate the first variable thrust control cylinder 40 clockwise about the axis of the first shaft 44. As the first variable thrust control cylinder 40 is rotated, the groove 45 is moved.

Although not shown in FIG. 6, a second actuator operatively connected to the second variable thrust control cylinder 42 may also be provided. The first and second actuators may be positioned on diametrically opposite sides of the flanged nozzle portion 26 so as to respectively couple to opposite ends of the first and second shafts 44 and 46. Alternatively, the first and second actuators may be positioned on the same side of the flanged nozzle portion 26 so as to respectively couple to adjacent ends of the first and second shafts 44 and 46. If the actuators are positioned on the same side of the flanged nozzle portion 26, it is possible to consolidate the retainer plates 50 and 52 into a single retainer plate having two orifices (through which the first and second shafts 44 and 46 respectively protrude to couple to the actuators).

One benefit to having the first variable thrust control cylinder 40 operatively associated to a different actuator than the second variable thrust control cylinder 42 is that rotation of the variable thrust control cylinders 40 and 42 can be controlled independently of each other. Independent control of the variable thrust control cylinders 40 and 42 is desirable, for example, to alter the pitch of rocket assembly 10.

The actuator 162 of this embodiment, and of the other embodiments illustrated in FIGS. 6–11, can be electromechanical actuators. The power source for operating the actuators can be either an existing power source (e.g., batteries or power sources of the rocket assembly) or a separate power source specifically designated for the electromechanical actuators. As an alternative to the electromechanical actuators, a hydraulic actuator can be used. Hydraulic actuators are well known in the art of thrust vector actuation. The actuator can also be powered by a piston arrangement, in which the piston is driven by a pyrotechnic or squib and return movement is accomplished by venting gases generated by the pyrotechnic or squib through a vent valve. The actuators mentioned herein are exemplary, not exhaustive, of actuating devices that can be used with the invention.

In operation, a missile guidance system may be provided for sending output signals to a control system, which controls the thrust control cylinder-rotating subassembly.

Figure 7:
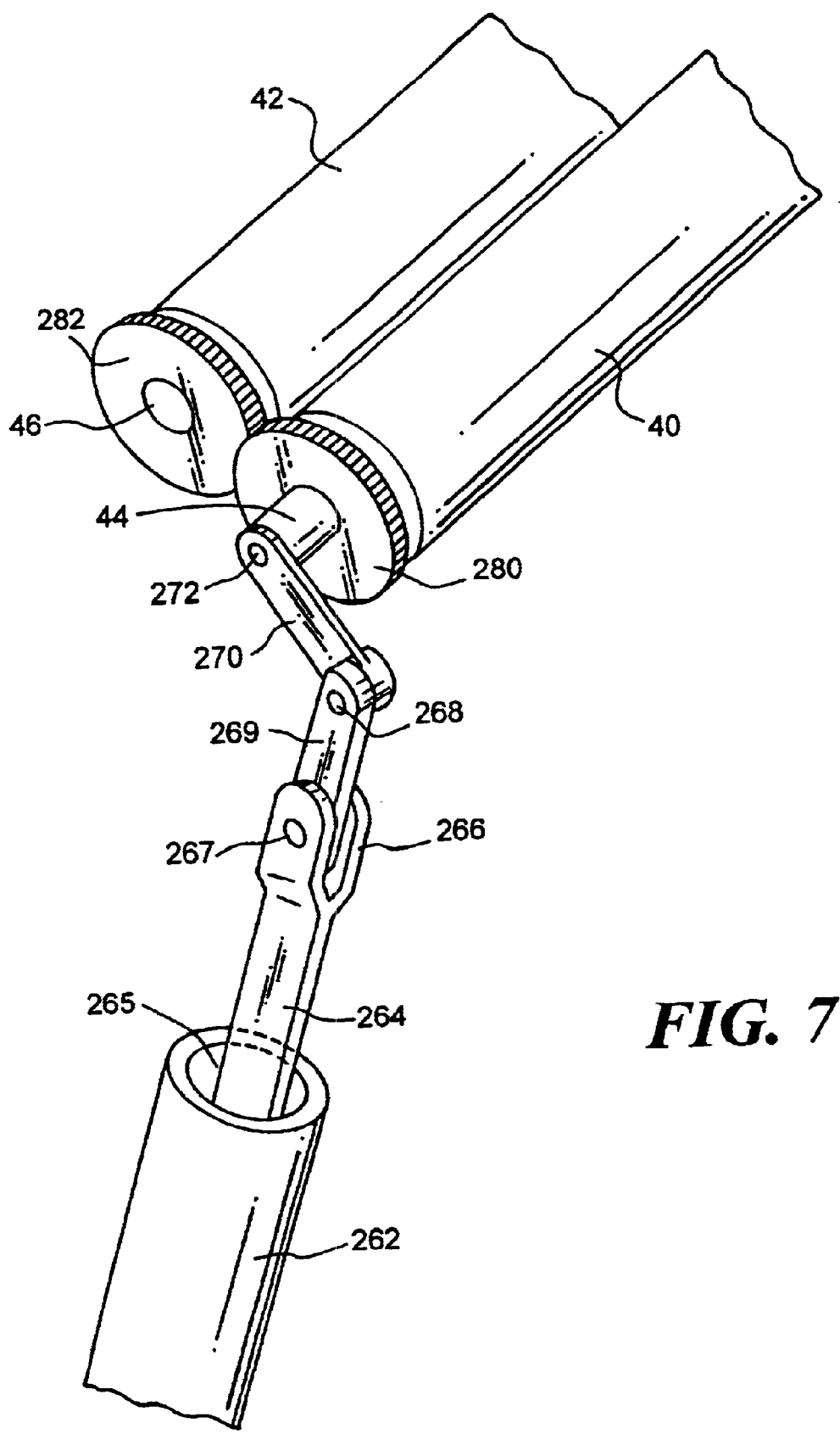
FIG. 7 is an isolated perspective view of a thrust control cylinder-rotating subassembly according to a second embodiment of the invention, depicting the thrust control cylinder-rotating subassembly operatively associated with both of the variable thrust control cylinders.

In accordance with a second embodiment of the invention shown in FIG. 7, the thrust control cylinder-rotating subassembly comprises a single actuator 262 operatively connected to both of the variable thrust control cylinders 40 and 42 to rotate the variable thrust control cylinders 40 and 42 in unison. The actuator 262 shown in FIG. 7 is a push-pull actuator having a push-pull rod 264 protruding from the mouth 265 of the actuator 262. The push-pull rod 264 terminates at a distal end having a clevis 266. The clevis 266 is pivotally connected at pivot pin 267 to connection link 269. The opposite end of the connection link 269 is coupled to arm 270 at pivot joint 268. The arm 270 is coupled to the first shaft 44 of the first variable thrust control cylinder 40 at joint 272. The joint 272 is designed to cause the first shaft 44 to rotate based on pivotal movement of the arm 270, i.e., so that no relative rotation occurs between the arm 270 and the first shaft 44. Mounted on the first shaft 44 is a first gear wheel 280. An identically sized second gear wheel 282 is mounted on the second shaft 46. The first and second gear wheels 280 and 282 are sized and positioned to have their respective teeth mesh with each other.

In operation, the actuator 262 can be operated in push and pull modes to move the clevis 266 of the push-pull rod 264 away from and towards the mouth 265, respectively. As the clevis 266 is pushed away from the mouth, the connection link 269 is also pushed, causing the end of the arm 270 coupled at pivot joint 268 to be raised, thereby causing the arm 270 to rotate the first shaft 44. The first variable thrust control cylinder 40 and the first gear wheel 280 are coaxially mounted on and fixed to the first shaft 44, so that counter-clockwise rotation of the first shaft 44 imparts an identical counterclockwise rotation to the cylinder 40 and first gear wheel 280. Intermeshing of the teeth of the first and second gear wheels 280 and 282 causes the second gear wheel 282 to be rotated by the first gear wheel 280 in clockwise direction. Because the second gear wheel 282 is coaxially mounted on and fixed to the second shaft 46, the second shaft 46 and second variable thrust control cylinder 42 are rotated in tandem with the second gear wheel 282.

Actuation of the actuator 262 in the opposite direction imparts a pulling effect on the connection link 269, causing both the first variable thrust control cylinder 40 to rotate in a clockwise direction and the second variable control cylinder 42 to rotate in a counterclockwise direction.

Figure 8:
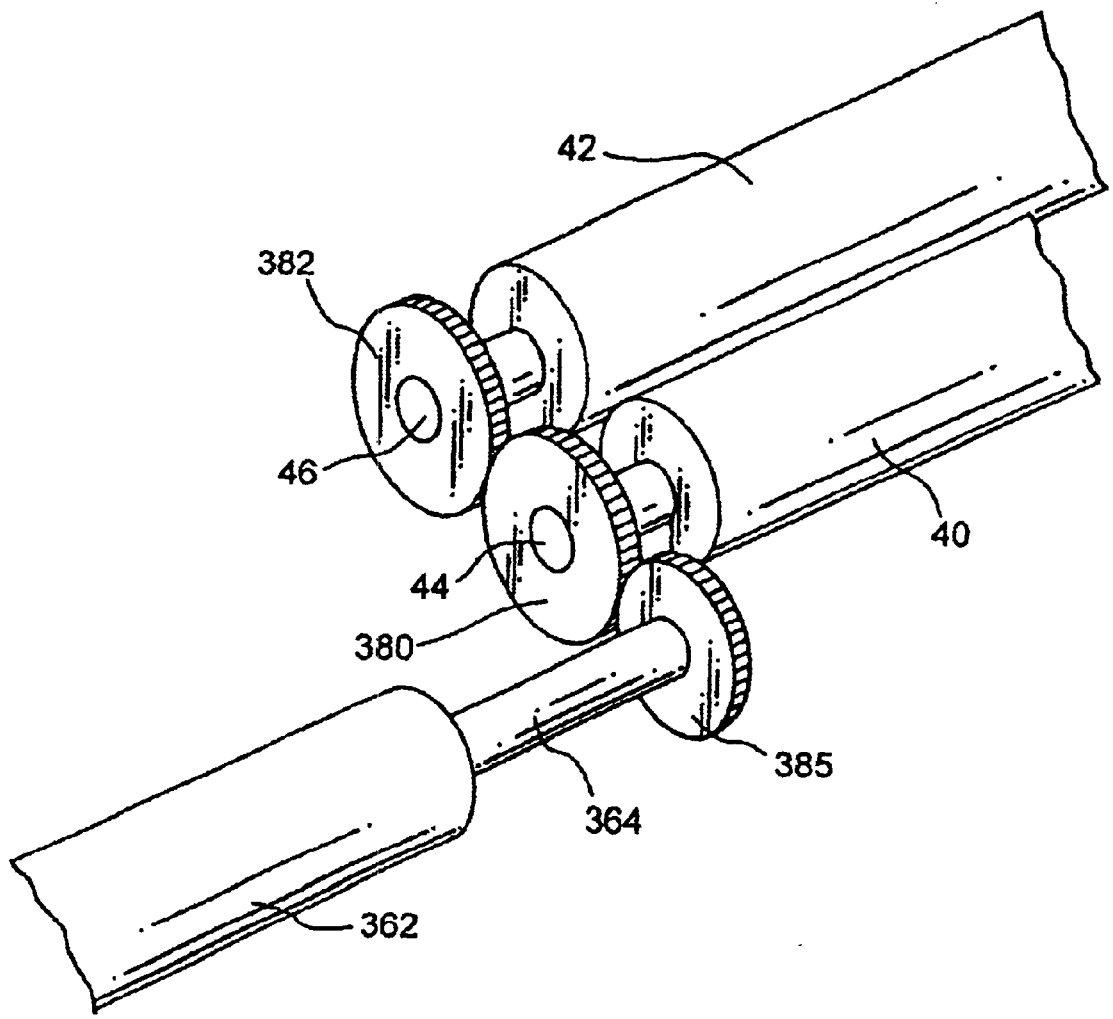
FIG. 8 is an isolated perspective view of a thrust control cylinder-rotating subassembly according to a third embodiment of the invention, depicting the thrust control cylinder-rotating subassembly operatively associated with both of the variable thrust control cylinders.

In accordance with a third embodiment of the invention shown in FIG. 8, the thrust control cylinder-rotating subassembly comprises a single actuator 362 operatively connected to both of the variable thrust control cylinders 40 and 42 to rotate the variable thrust control cylinders 40 and 42 in unison. Unlike actuators 162 and 262 of the first and second embodiments, the actuator 362 shown in FIG. 8 has an actuator rod 364 rotatable in clockwise and counterclockwise directions. In the illustrated embodiment, the actuator rod 364, the first shaft 44, and the second shaft 46 are arranged in the same plane, with the first shaft 44 interposed between the actuator rod 364 and the second shaft 46. The actuator rod 364 terminates at an actuator gear wheel 385, which has teeth intermeshing with the teeth of a first gear wheel 380, which is coaxially mounted on and fixed to the first shaft 44. Teeth at a diametrically opposite portion of the first gear wheel 380 intermesh with teeth of a second gear wheel 382, which is coaxially mounted on and fixed to the second shaft 46. As referred to herein, parts that are "fixed to" refers to parts that rotate together, rather than permitting relative rotation of one part while the other part remains stationary (i.e., without rotational movement).

In operation, rotation of the actuator rod 364 and the actuator gear wheel 385 in a clockwise direction causes both the first gear wheel 380 and the first shaft 44 fixed thereto to rotate counterclockwise, and in turn rotates the first variable thrust control cylinder 40 in a counterclockwise direction. The second gear wheel 382, which intermeshes with the first gear wheel 380, is rotated in a clockwise direction. Rotation of the second gear wheel 382 causes the second shaft 46 fixed thereto, and the second variable thrust control cylinder 42 mounted on the second shaft 46, to also rotate in a clockwise direction. In this manner, the first and second grooves 45 and 47 (not shown in FIG. 8) can be rotated to the open position, the fully closed position, and to any intermediate position therebetween. This process can be reversed by rotating the actuator rod 364 and the actuator gear wheel 385 counterclockwise to thereby rotate the first shaft 44 and the first variable thrust control cylinder 40 in a clockwise direction, and the second shaft 46 and the second variable thrust control cylinder 42 in a counterclockwise direction.

It is to be understood that the third embodiment can be modified by placing the actuator gear wheel 385 between the first and second gear wheels 380 and 382, so that the teeth of the actuator gear wheel 385 intermesh with respective teeth of both the first and second gear wheels 380 and 382.

Figure 9:
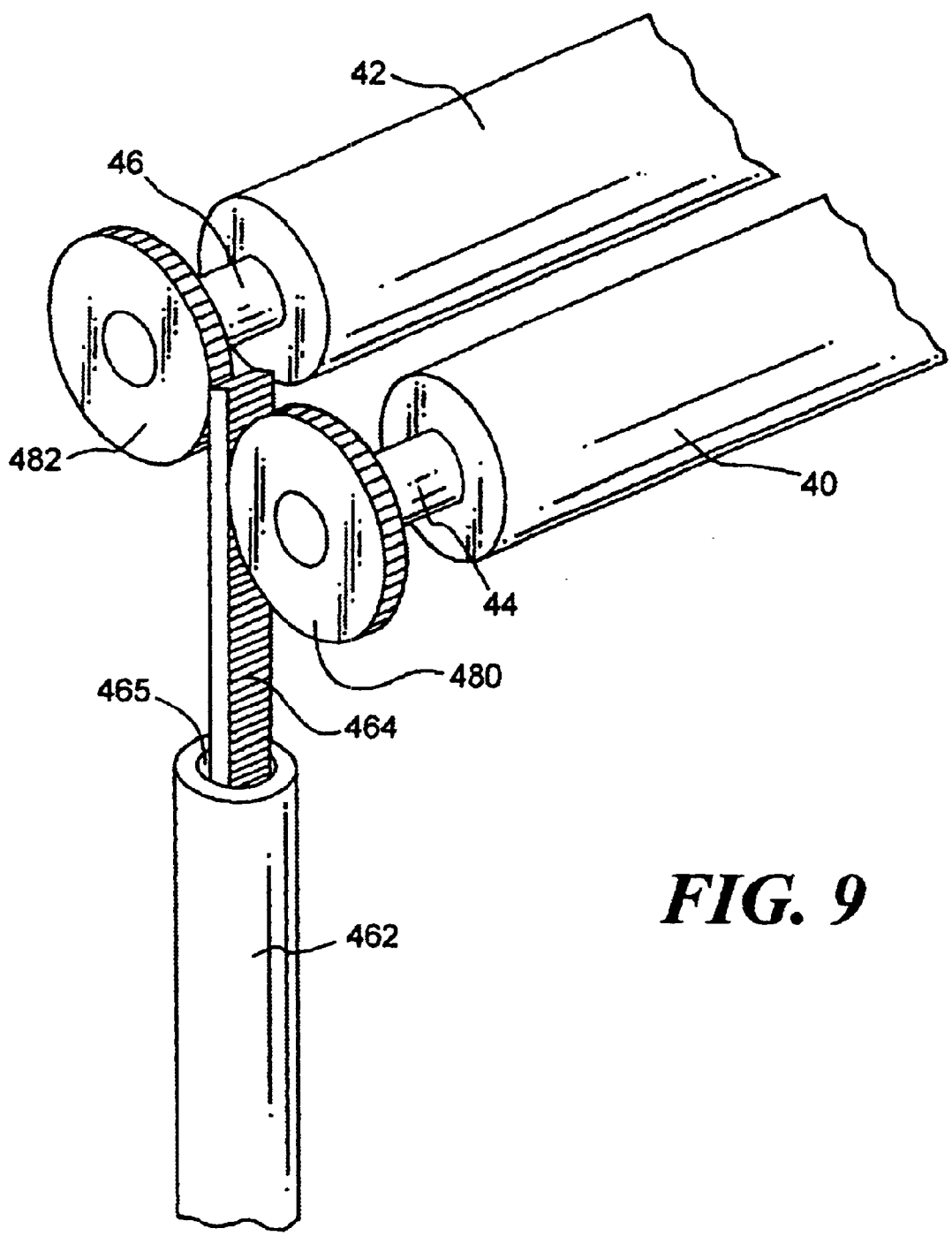
FIG. 9 is an isolated perspective view of a thrust control cylinder-rotating subassembly according to a fourth embodiment of the invention, depicting the thrust control cylinder-rotating subassembly operatively associated with both of the variable thrust control cylinders.

In a fourth embodiment of the invention shown in FIG. 9, the thrust control cylinder-rotating subassembly comprises a single actuator 462 operatively connected to both of the variable thrust control cylinders 40 and 42 to rotate the variable thrust control cylinders 40 and 42 in unison. The actuator 462 includes a push-pull linear gear 464. The push-pull linear gear 464 extends between co-planar first and second gear wheels 480 and 482. A surface of the push-pull linear gear 464 facing the first gear wheel 480 includes teeth that intermesh with the teeth of the first gear wheel 480. An opposite surface (not seen in the perspective view of FIG. 9) of the push-pull linear gear 464 facing the second gear wheel 482 has teeth that intermesh with the teeth of the second gear 482. (It is to be understood that the fourth embodiment can be modified, for example, by interposing the first gear wheel 480 between the push-pull linear gear 464 and the second gear wheel 482 in an arrangement similar to that shown in FIG. 8, but in which the actuator gear wheel 385 is replaced by the push-pull linear gear 464.)

In operation, pulling of the push-pull linear gear 464 towards the mouth 465 of the actuator 462 causes both the first shaft 44 and the first variable thrust control cylinder 40 fixed thereto to rotate in a counterclockwise direction, and causes the second shaft 46 and the second variable thrust control cylinder 42 fixed thereto to rotate in a clockwise direction. Pushing the push-pull linear gear 464 away from the mouth 465 of the actuator 462 causes the first shaft 44 and the first variable thrust control cylinder 40 to rotate in a clockwise direction, and causes the second shaft 46 and the second variable thrust control cylinder 42 to rotate in a counterclockwise direction. Controlling the movement of the push-pull linear gear 464 permits continuous variable control over the effective cross-sectional area of the throat opening defined between the first and second grooves 45 and 47 (not shown in FIG. 9).

A fifth embodiment of the invention is shown in FIGS. 10A–10C and 11 and represents a divert and attitude control system. The fifth embodiment includes an actuator 562, an actuator rod 564, an actuator gear wheel 585, and first and second gear wheels 580 and 582 that are substantially similar to the arrangement shown in FIG. 8, except that the actuator gear wheel 585 is interposed between the first and second gear wheels 580 and 582. A first inner shaft 544 extends coaxially from the first gear wheel 580 and coaxially through both the first shaft 44 and the first variable thrust control cylinder 40. The first inner shaft 544 includes an elongated protrusion 544a (FIG. 11) extending along its length. The protrusion 544a is slidably received in a complementary channel (unnumbered) of the first shaft 44, so that rotation of the first inner shaft 544 transfers an identical rotational movement to the first shaft 44 mounted thereon. Likewise, a second inner shaft 546 extends coaxially from the second gear wheel 582 and coaxially through both the second shaft 46 and the second variable thrust control cylinder 42. Although not shown, the second inner shaft 546 also includes an elongated protrusion slidably received in a channel of the second shaft 46. Actuation of the actuator 562 rotates the first and second variable thrust control cylinders 40 and 42 about their respective axes to variably control the positions of the grooves 45 and 47, and, therefore, the effective cross-sectional area of the passageway at the throat region 34.

The fifth embodiment also includes a first push-pull actuator 590 and a second push-pull actuator 592. The first push-pull actuator 590 is operatively engaged with the first shaft 44 and the first variable thrust control cylinder 40 to effect axial movement of the first shaft 44 and the first variable thrust control cylinder 40. The first push-pull actuator 590 is not operatively engaged with the first inner shaft 544 and does not effect axial movement of the first inner shaft 544. Hence, actuation of the first push-pull actuator 590 axially slides the first shaft 44 and the first variable thrust control cylinder 40 relative to the first inner shaft 544. As the first variable thrust control cylinder 40 is moved axially, the first groove 45 is also moved relative to the central axis $L_x$ of the nozzle.

The second push-pull actuator 592 is similarly operatively engaged with the second variable thrust control cylinder 42 and the second shaft 46, but not the second inner shaft 546, to permit axial movement of the variable thrust control cylinder 42 and the second shaft 46 relative to the second inner shaft 546. In this manner, the second groove 47 can be moved out of alignment with the longitudinal axis $L_x$ of the nozzle.

Figure 10A:
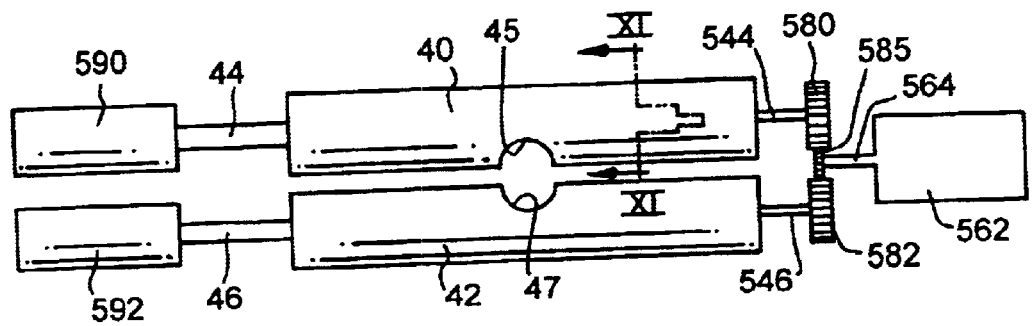
FIGS. 10A–10C are isolated overhead views of a thrust control cylinder-rotating/displacement subassembly according to a fifth embodiment of the invention, depicting the thrust control cylinder-rotating/displacement subassembly operatively associated with both of the variable thrust control cylinders positioned in an open state, a roll state, and a yaw state, respectively.
Figure 10B:
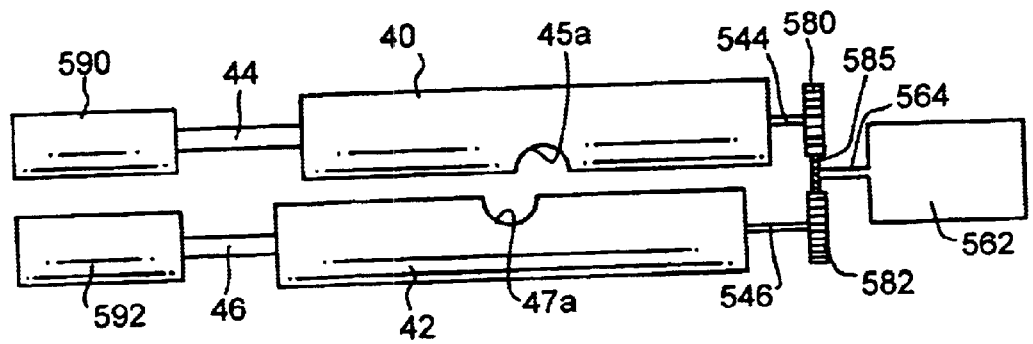
Figure 10C:
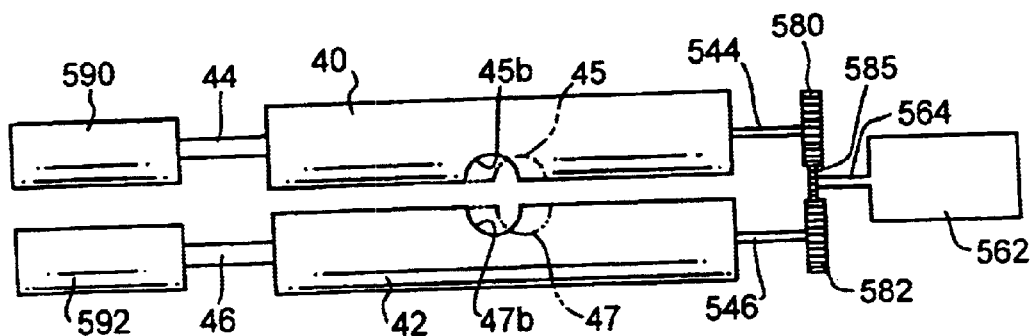
Figure 11:
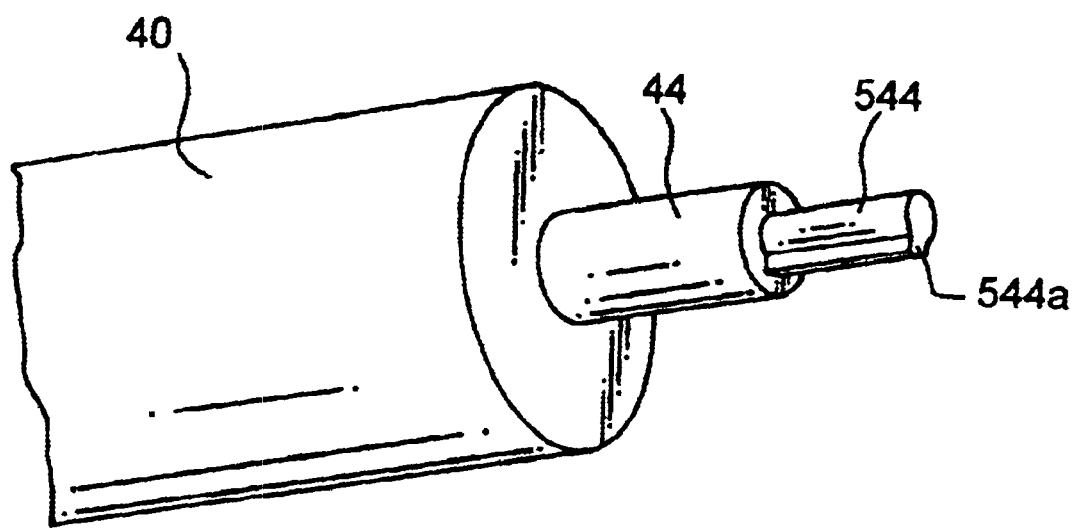
FIG. 11 is a sectional view of one of the variable thrust control cylinders of FIGS. 10A–10C taken along sectional line XI—XI of FIG. 10A.

The first and second push-pull actuators 590 and 592 may be operated independently of each other to axially move one of the variable thrust control cylinders 40 and 42 or to axially move both of the variable thrust control cylinders 40 and 42 in opposite directions, as shown in FIG. 10B. By axially moving the first and second variable thrust control cylinders 40 and 42 in opposite directions by equal axial distances, as shown in FIG. 10B, the first and second grooves 45a and 47a can be offset from each other to impart roll to the rocket assembly 10. As shown in FIG. 10C, axial movement of the first and second variable thrust control cylinders 40 and 42 in the same direction to axially move the grooves from positions 45 and 47 to 45b and 47b (out of alignment with longitudinal axis $L_x$) can impart yaw to the rocket assembly 10.

In order to improve the pitch, yaw, and roll effects of the fifth embodiment, it is preferred that the throat region 34 and diverging region 38 have relatively small length/diameter ratios. For example, the throat region 34 may have a length/diameter ratio of about 1:1.

The rotating gear actuator 562 of the fifth embodiment can be replaced with the two independent push-pull actuators of the first embodiment (FIG. 6) or the push-pull actuator of the second embodiment (FIG. 7) or the fourth embodiment (FIG. 9), as well as the alternative arrangement of the third embodiment (FIG. 8) in which the teeth of the actuator gear intermesh with one of the gear wheels.

The foregoing detailed description of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A rocket nozzle assembly for rocket motor having a converging passageway and a diverging passageway, said rocket nozzle assembly comprising:
    a nozzle insert structure having a converging region that converges in cross-section meeting a throat region aft of the converging region, and a diverging region aft of the throat region extending radially outwardly, the converging region and throat region and diverging region substantially coaxially aligned along a central axis of a passageway defining the converging passageway and the diverging passageway;
    a first thrust control cylinder rotatable about a first axis extending transverse to the central axis of the passageway, the first thrust control cylinder intersecting the throat region, and the first thrust control cylinder including a first groove extending transverse to the first axis;
    a second thrust control cylinder rotatable about a second axis extending transverse to the central axis of the passageway, the second thrust control cylinder intersecting the throat region, and the second thrust control cylinder including a second groove extending transverse to the second axis, the first axis of the first thrust control cylinder being substantially parallel to and spaced apart from the second axis of the second thrust control cylinder, the first axis and the second axis lying in a plane that is substantially normal to the central axis of the passageway; and
    at least one thrust control cylinder-rotating subassembly associated with the first thrust control cylinder and the second thrust control cylinder to rotate the first thrust control cylinder and the second thrust control cylinder about the first axis and the second axis, respectively, to move the first groove and the second groove relative to the throat region for changing an effective cross-sectional area of the throat region of the converging passageway and the diverging passageway at the throat region for controlling the thrust of an operating rocket motor.

2. The rocket nozzle assembly of claim 1, wherein the at least one thrust control cylinder-rotating subassembly is associated with the first thrust control cylinder and the second thrust control cylinder to rotate the first groove and the second groove relative to the throat region between an open position, in which the first and second grooves face each other from opposite sides of the throat region to maximize the effective cross-sectional throat area, and at least one throat-reduction position, in which outer surface portions of the first thrust control cylinder and the second thrust control cylinder intersect and partially obstruct a portion of the converging passageway and the diverging passageway at the throat region to reduce the effective cross-sectional throat area relative to a maximum effective cross-sectional throat area in the open position.

3. The rocket nozzle assembly of claim 2, wherein the thrust control cylinder-rotating subassembly is operatively associated with the first thrust control cylinder and the second thrust control cylinder to rotate the first thrust control cylinder and the second thrust control cylinder about the first axis and the second axis to a fully closed throat-reduction position, in which the effective cross-sectional throat area is unaffected by the first and second grooves.

4. The rocket nozzle assembly of claim 3, wherein the thrust control cylinder-rotating subassembly is operatively associated with the first thrust control cylinder and the second thrust control cylinder to rotate and maintain the first thrust control cylinder and the second thrust control cylinder at any rotational position between the open position and a fully closed throat-reduction position to proportionally transform the effective cross-sectional throat area of the converging passageway and the diverging passageway at the throat region.

5. The rocket nozzle assembly of claim 2, wherein in the open position, the converging passageway and the diverging passageway at the throat region has a circular cross-section that is substantially unobstructed by the outer surface portions.

6. The rocket nozzle assembly of claim 2, wherein in the at least one throat-reduction position, the converging passageway and the diverging passageway at the throat region has a substantially rectangular cross-section that is partially obstructed by the outer surface portions.

7. The rocket nozzle assembly of claim 2, wherein the first groove and the second groove have curvilinear cross-sections dimensioned and shaped substantially identically to surrounding inner peripheral regions of the nozzle insert structure at the throat region.

8. The rocket nozzle assembly of claim 2, wherein the thrust control cylinder-rotating subassembly is operatively associated with the first thrust control cylinder and the second thrust control cylinder to rotate the first thrust control cylinder and the second thrust control cylinder by more than 90 degrees about the first axis and the second axis, respectively.

9. The rocket nozzle assembly of claim 2, wherein the thrust control cylinder-rotating subassembly is operatively associated with the first thrust control cylinder and the second thrust control cylinder to rotate the first thrust control cylinder and the second thrust control cylinder by approximately 180 degrees about the first axis and the second axis, respectively.

10. A rocket nozzle assembly for coupling to a rocket motor having a converging passageway and a diverging passageway, said rocket nozzle assembly comprising:
    a nozzle insert structure providing a converging region that converges in cross-section to meet a throat region aft of the converging region, and a diverging region aft of the throat region extending radially outwardly, the converging region and the diverging region and the throat region being substantially coaxially aligned along a central axis of a passageway collectively defining the converging passageway and the diverging passageway;
    a first thrust control cylinder rotatable about a first axis transverse to the central axis of the converging passageway and the diverging passageway, the first thrust control cylinder intersecting the throat region including a first groove extending transverse to the first axis;
    a second thrust control cylinder rotatable about a second axis transverse to the central axis of the converging passageway and the diverging passageway, the second thrust control cylinder intersecting the throat region including a second groove extending transverse to the second axis, the first axis of the first thrust control cylinder being substantially parallel to and spaced apart from the second axis of the second thrust control cylinder, the first and second axes both lying in a plane that is substantially normal to the central axis of the passageway; and at least one thrust control subassembly associated with the first thrust control cylinder and the second thrust control cylinder to rotate the first thrust control cylinder and the second thrust control cylinder about a first shaft and a second shaft between an open position, in which the first groove and the second groove face each other from opposite sides of the throat region to provide the converging passageway and the diverging passageway at the throat region with a maximum effective cross-sectional throat area in an open position, and at least one throat-reduction position, in which a first outer surface and a second outer surface have respective outer surface portions that intersect and partially obstruct the converging passageway and the diverging passageway at the throat region to provide the throat region with an effective cross-sectional throat area that is smaller than the maximum effective cross-sectional throat area in the open position for rotation of the first thrust control cylinder and the second thrust control cylinder to vary the effective cross-sectional area of the throat region for controlling the thrust when the rocket nozzle assembly is engaged with an operating rocket motor.

11. The rocket nozzle assembly of claim 10, wherein the at least one thrust control subassembly comprises a first push-pull actuator and a second push-pull actuator coupled to the first shaft and the second shaft, respectively.

12. The rocket nozzle assembly of claim 11, further comprising a first gear wheel and a second gear wheel respectively mounted on and fixed to the first shaft and the second shaft so that rotation of the first gear wheel and the second gear wheel respectively causes the first thrust control cylinder and the second thrust control cylinder to rotate, the at least one thrust control apparatus further comprising an actuator comprising an actuator gear wheel associated with the first gear wheel and the second gear wheel to rotate the first thrust control cylinder and the second thrust control cylinder about the first shaft and the second shaft between the open position and the at least one throat-reduction position.

13. The rocket nozzle assembly of claim 12, wherein the actuator gear wheel and the first gear wheel each comprise respective teeth that intermesh, and the first gear wheel and the second gear wheel each comprise respective teeth that intermesh.

14. The rocket nozzle assembly of claim 10, wherein the at least one thrust control subassembly comprises a linear gear actuator.

15. The rocket nozzle assembly of claim 10, wherein the at least one thrust control subassembly further comprises a divert and attitude control system associated with the first thrust control cylinder and the second thrust control cylinder to axially displace the first thrust control cylinder and the second thrust control cylinder, respectively.

16. The rocket nozzle assembly of claim 15, wherein the divert and attitude control system is operatively associated with the first thrust control cylinder and the second thrust control cylinder to axially and independently displace the first thrust control cylinder and the second thrust control cylinder in the same axial direction or in opposite axial directions.

17. A rocket assembly comprising:
a case;
at least one propellant loaded in the case; and
at least one rocket nozzle assembly according to claim 1 coupled to the case.

18. A rocket assembly comprising:
a case;
at least one propellant loaded in the case; and
at least one rocket nozzle assembly according to claim 10 coupled to the case.

* * * * *

UNITED STATES PATENT AND TRADEMARK OFFICE
CERTIFICATE OF CORRECTION

PATENT NO. : 6,651,438 B2
DATED : November 25, 2003
INVENTOR(S) : David K. McGrath, Thomas J. Kirschner, Jr. and Daniel C. Dombrowski It is certified that error appears in the above-identified patent and that said Letters Patent is hereby corrected as shown below:

Column 2,
Line 15, change "fustro-conical" to -- frusto-conical --
Line 19, change "frustro-conical" to -- frusto-conical --

Column 3,
Line 49, after "position" and before the semicolon, insert -- and FIG. 1A is an enlarged sectional side view of the circled area in FIG. 1 --
Line 52, after "position" and before the semicolon, insert -- and FIG. 2A is an enlarged sectional side view of the circled area in FIG. 2 --

Column 4,
Line 27, change "1 and 2" to -- 1, 1A, 2 and 2A --

Column 6,
Line 38, change "30," to -- 50 --

Column 7,
Line 31, before "insert" change "throat" to -- nozzle --

Column 10,
Line 63, change "refers" to -- refer --

Column 11,
Line 37, after "gear" and before "482" insert -- wheel --

Column 12,
Line 32, change "central" to -- longitudinal --
Line 53, after "positions" insert -- of grooves -- and after "to" insert -- the positions indicated by grooves --

Column 13,
Line 13, after "for" and before "rocket" insert -- a --
Line 20, before "throat" insert -- the -- and before "diverging" insert -- the --
Lines 58 and 65, change "throat area" to -- area of the throat region --

Column 14
Lines 5 and 14, change "throat area" to -- area of the throat region --
Line 33, at the beginning of the line, before "thrust" insert -- at least one --
Line 40, before "thrust" insert -- at least one --

UNITED STATES PATENT AND TRADEMARK OFFICE
CERTIFICATE OF CORRECTION

PATENT NO. : 6,651,438 B2
DATED : November 25, 2003
INVENTOR(S) : David K. McGrath, Thomas J. Kirschner, Jr. and Daniel C. Dombrowski It is certified that error appears in the above-identified patent and that said Letters Patent is hereby corrected as shown below:

Column 15,
Line 16, before "open" change "an" to -- the --

Signed and Sealed this

Eleventh Day of January, 2005

JON W. DUDAS
*Director of the United States Patent and Trademark Office*